Jan. 2, 1951 H. KIHN 2,536,504

ULTRA HIGH FREQUENCY SIDE BAND FILTER NETWORK

Filed April 26, 1947

Inventor
Harry Kihn

By
C. D. Tuska
Attorney

Patented Jan. 2, 1951

2,536,504

UNITED STATES PATENT OFFICE 2,536,504

ULTRA HIGH FREQUENCY SIDE BAND FILTER NETWORK

Harry Kihn, Lawrenceville, N. J., assignor to Radio Corporation of America, a corporation of Delaware Application April 26, 1947, Serial No. 744,128

11 Claims. (Cl. 178—44)

Figures 1, 2, 3, 4, 5:
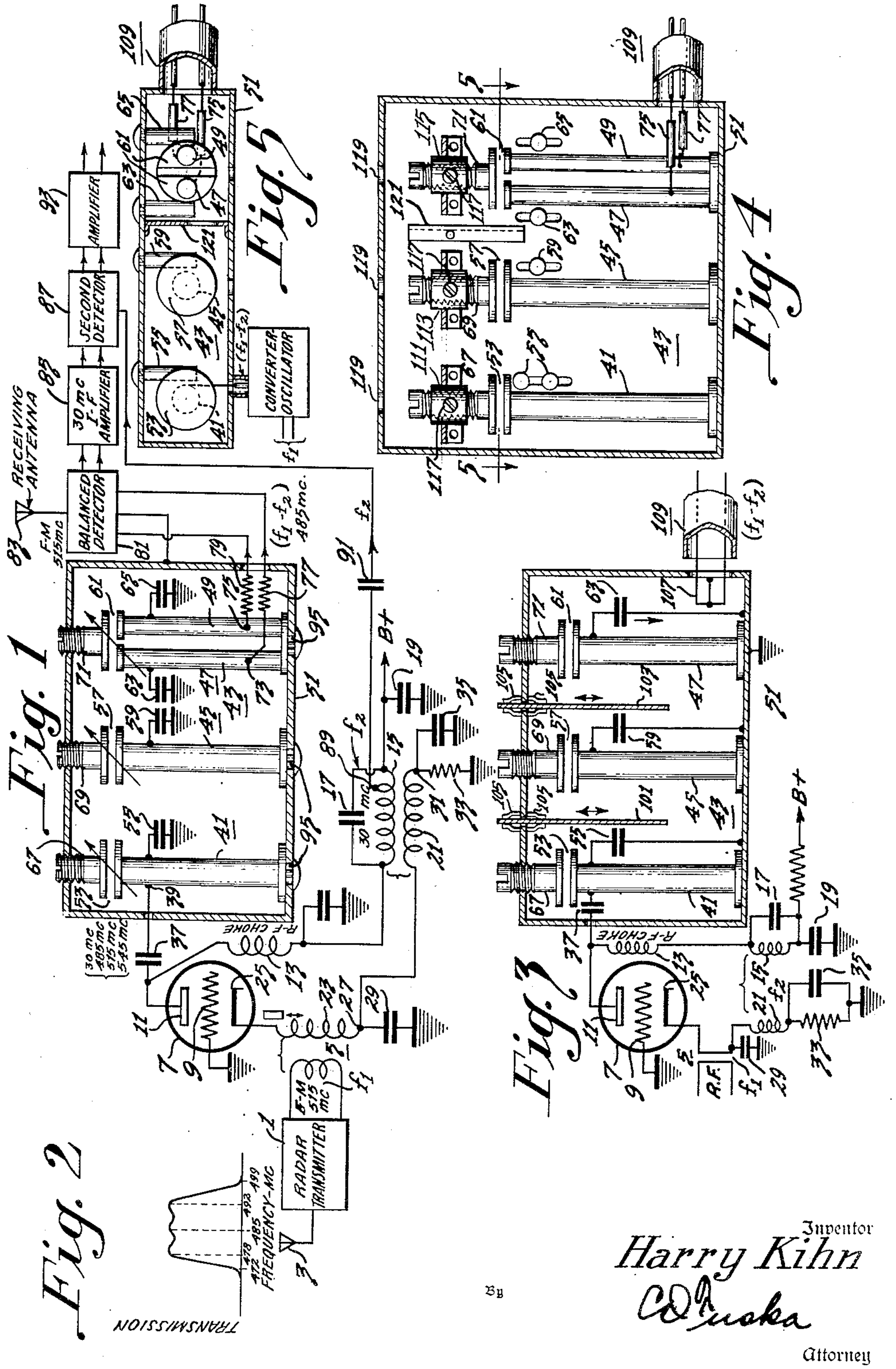

This invention relates generally to ultra-high-frequency apparatus and more particularly to an improved ultra-high-frequency band-pass filter network having relatively wide-band frequency response and sharp frequency cut-off characteristics.

In ultra-high-frequency radar and object locator systems employing frequency-modulated signals, it is customary to utilize a portion of the frequency-modulated energy derived from the transmitter for combination with the received reflected frequency-modulated signals derived from the object to be located. In systems of this type and in vestigial sideband ultra-high-frequency television receivers, and the like, it is essential that a relatively wide-band, sharp cut-off ultra high frequency filter network be employed for separating the desired from the undesired signal components.

In frequency modulation radar systems of the type described, a portion of the frequency-modulated transmitter signals is mixed with locally generated substantially lower frequency local oscillations to provide a single side-band signal which may be subsequently mixed with the received frequency-modulated signals to provide a substantially lower intermediate frequency-modulated signal which is detected and utilized to provide the desired information with respect to the object to be located. In a typical system of this type, the frequency modulated radar transmitter provides frequency-modulated signals having a mean frequency of 515 mc. A portion of the transmitter energy is combined in a local oscillator-modulator circuit providing 30 mc. local oscillations. The modulation components of 30, 485, 515 and 545 mc. are applied to the novel side-band filter network comprising the instant invention, and the 30, 515 and 545 mc. signal components are rejected, while the 485 mc. frequency modulated signals are transmitted with minimum attenuation to provide a balanced output frequency-modulated signal having a mean frequency of 485 mc. which is applied to the balanced first detector of the radar receiver. The received frequency-modulated 515 mc. signals derived from the object to be located are combined in the balanced detector with the frequency-modulated signals having a mean frequency of 485 mc. derived from the filter network to provide frequency-modulated intermediate frequency signals having a mean frequency of 30 mc. The intermediate frequency-modulated signals thence are applied to a second detector wherein they are combined with the locally generated 30 mc. oscillations, and thence are amplified and utilized to derive the required information concerning the objects to be located.

It is essential that the side band filter network be adjustable both as to its cut-off frequencies and its coupling factors to provide the desired selectivity and transmission characteristics. According to the instant invention, a side band filter, having a mean pass frequency of 485 mc. and substantially unattenuated transmission signal frequencies between 478 and 492 mc. comprises a hollow shielding enclosure containing a plurality of cylindrical, or otherwise shaped, inductive elements each having an adjustable series capacitor element and a fixed or adjustable parallel capacitor element. The inductive elements are arranged in spaced parallel adjustable relation within the shielding enclosure and, if desired, adjustable coupling shields may be interposed between the several inductive elements. Input signals are capacitively coupled to one of the inductive elements adjacent to one end of the shielding enclosure, and a balanced output circuit is coupled to two other ones of the inductive elements located adjacent to the opposite end of the shielding enclosure. In a first embodiment of the invention the balanced output circuit may comprise separate connections to each of the two output inductors. In a second embodiment of the invention, the balanced output circuit may comprise a coupling loop coupled in phase opposition to the two output filter inductors. In both embodiments of the invention, the several filter stages are each tuned to the desired mid-frequency of the pass band and the two output filter sections are tuned in push-pull to the desired pass band mid-frequency. The push-push resonance of the balanced output circuit is selected to occur at a frequency well removed from the desired pass band.

Among the objects of the invention are to provide an improved method of and means for filtering ultra-high-frequency signals. Another object is to provide an improved ultra-high-frequency band-pass filter for frequency-modulated signals. An additional object is to provide an improved ultra-high-frequency filter having substantially uniform transmission characteristics over a relatively wide frequency band and relatively sharp cut-off frequency characteristics above and below said frequency band. A further object of the invention is to provide an improved ultra-high-frequency band pass filter having a balanced output circuit which is push-pull resonant to the mean frequency of the desired frequency pass band. A still further object of the invention is to provide an improved ultra high frequency band pass filter comprising a plurality of cylindrical inductive elements having series capacitive tuning means and arranged in parallel spaced relation within a common shielding enclosure. An additional object is to provide an improved ultra-high-frequency band pass filter network having a plurality of spaced self-resonant inductive elements including adjustable series and parallel capacitive elements and including a balanced output circuit comprising two of such resonant inductive elements exhibiting push-pull resonance to the mid-frequency of the desired frequency pass band.

The invention will be described in greater detail by reference to the accompanying drawing of which Figure 1 is a schematic circuit diagram of a portion of a typical frequency modulation radar system employing the invention, Figure 2 is a graph illustrative of the transmission characteristics of the filter network employed in the circuit of Fig. 1, Figure 3 is a schematic circuit diagram of a second embodiment of the invention, Figure 4 is an elevational cross-sectional view of a third embodiment of the invention, and Figure 5 is a top cross-sectional view of said third embodiment of the invention. Similar reference characters are applied to similar elements throughout the drawing.

Referring to Figure 1 of the drawing, the invention is described with reference to its application as a side band filter in a frequency modulation object locator system. A frequency-modulated radar transmitter 1 connected to a transmission antenna 3 generates frequency-modulated continuous wave signals having a mean frequency, for example, of 515 mc., the modulation side bands extending from 508 to 522 mc. A portion of the transmitted frequency modulated energy is coupled through an ultra-high-frequency transformer 5 to the cathode circuit of a triode oscillator-modulator tube 7. The oscillator-modulator tube 7 has its grid electrode 9 grounded. The anode 11 is connected through a radio frequency choke coil 13 to a resonant circuit comprising an inductor 15 and shunt capacitor 17 tuned to a frequency of 30 mc. A source of anode potential, not shown, is serially connected through the inductor 15 and radio frequency choke coil 13 to the anode 11 of the tube. A bypass capacitor 19 is connected between the source of anode potential and ground. The 30 mc. resonant circuit 15, 17 is inductively coupled to a cathode inductor 21 which is connected through the secondary winding 23 of the transformer 5 to the cathode 25 of the tube. The low potential terminal 27 of the secondary winding 23 of the transformer 5 is coupled to ground through a cathode coupling capacitor 29. The low potential terminal 31 of the cathode inductor 21 is grounded through a shunt-connected resistor 33 and capacitor 35.

The circuit thus described generates 30 mc. local oscillations which are modulated in the tube 7 with the 515 mc. frequency-modulated signals coupled thereto through the ultra-high-frequency transformer 5. The radio frequency choke coil 13 prevents loading of the filter network input circuit by the 30 mc. oscillator tank circuit 15, 17. The anode 11 of the tube 7 is coupled through an output capacitor 37 to a selected point 39 on a first cylindrical resonant inductive element 41 of the side band filter network 43 constituting the instant invention.

The filter network 43 includes resonant inductive elements 41, 45, 47 and 49 disposed in spaced parallel relation within a shielding enclosure 51. The inductive element 41 is tuned by an adjustable series capacitor 53 and a shunt capacitor 55. The inductive element 45 is tuned by an adjustable series capacitor 57 and a shunt capacitor 59. The inductive elements 47 and 49, disposed adjacent to the end of the shielding enclosure 51 remote from the input connection 39, are simultaneously tuned by a common series capacitor 61 and by separate shunt capacitors 63, 65, respectively. The adjustable series capacitors 53, 57 and 61 are adjusted by rotation of threaded cylindrical members 67, 69, 71 threaded into the top wall of the shielding enclosure 51. The first resonant circuit 41, 53, 55 and the second resonant circuit 45, 57, 59 of the filter network 43 are tuned to resonance at the desired pass mid-frequency of 485 mc. which is the difference frequency between the mean transmitted 515 mc. frequency-modulated signals and the locally generated 30 mc. oscillations. The pass frequency band of the filter is indicated in the graph of Figure 2. The output tuned circuit comprising the elements 47, 49, 61, 63 and 65 is tuned to push-pull resonance at the mean pass frequency of 485 mc., the push-push resonance thereof being well removed from the pass frequency band.

Output connections from predetermined points 73, 75 on the output inductive elements 47, 49, respectively, are connected through series resistors 77, 79, respectively, to a balanced first detector 81 of the frequency-modulation radar receiving system. The balanced detector 81 is also connected to a receiving antenna 83 for reception of frequency modulated 515 mc. signals derived by reflection from an object to be detected. A balanced first detector 81 is employed in the receiving circuit to eliminate receiver response to amplitude modulation of the transmitted or received signals. The difference frequency modulation component of the balanced detector 81 comprising 30 mc. signals representing the difference frequency between the received 515 mc. and the 485 mc. signals derived from the filter network 43 is coupled through a 30 mc. intermediate-frequency amplifier 85 to a second detector 87. In the second detector, the intermediate frequency signals are compared with the locally generated 30 mc. signals which are coupled to the second detector from an intermediate point 89 on the local oscillator inductor 15 through a coupling capacitor 91. The output signals derived from the second detector 87 are applied to an amplifier 93 and utilized in any desired manner to provide the required information concerning the objects to be detected.

It is essential that the 485 mc. mixing signals derived from the filter network 43 contain a minimum of 515, 545 and 30 mc. modulation components. The presence of a strong modulation component of 515 mc. in the mixing signals will produce a relatively large 30 mc. voltage in the first detector even though no signal is received on the receiving antenna. This would cause microphonics in the intermediate frequency amplifier tube and would also reproduce any existing transmitter amplitude modulation. The novel side band filter described heretofore in conjunction with the balanced first detector operation serves to reduce this undesired feedthrough to negligible proportions. The resistors 77, 79 in the coupling circuit from the filter to the balanced detector are utilized to insure low Q and wide frequency band response in the detector circuit.

The function of the balanced detector is to heterodyne the reflected frequency modulated signals derived from the object to be detected with the signal derived from the output of the side band filter. By virtue of its balanced circuit, the first detector will discriminate against amplitude modulated signals received from both the receiving antenna or generated in the transmitter or side band filter circuits, and will provide additional discrimination against the effects of all but the desired lower side band mixing signals. Since the received signal circuit and the heterodyning circuits are tuned to frequencies separated by 30 mc., there is little interaction between them with consequent less critical balance than in conventional straight audio systems.

In order to tune the filter network 43 to provide the desired frequency band width response, it is essential that each of the coupled circuits be tuned to resonance to the mean pass frequency of the desired side band and that the coupling between adjacent inductive filter elements be adjusted to provide the desired band width. Such coupling adjustment may be provided by any convenient mechanical means whereby the physical separation of the inductive elements may be adjusted. For example, the inductive elements may be secured to the shielding enclosure 51 by screws through longitudinal slots 95 in the enclosure base.

A second embodiment of the invention illustrated in Figure 3 is similar in all respects to that described heretofore by reference to Fig. 1 with the exception that adjustable shielding elements 101, 103 extending into the shielding enclosure 51 intermediate the inductive elements 41, 45 and 45, 47, 49 permit variation of coupling between successive filter network sections by adjustment without the enclosure of the penetration of the shielding elements within the shielding enclosure. The shielding elements 101 and 103 are supported within the shielding enclosure 51 by inwardly and outwardly extending contact elements 105 mounted adjacent to entrance apertures in the top wall of the shielding enclosure.

Another feature wherein the device of Fig. 3 differs from that of Fig. 1 is that a single output inductive element 47 is coupled to the balanced detector circuit by means of a coupling loop 107 having its center point grounded to the shielding enclosure. The coupling loop 107 is coupled through a transmission line 109 to the balanced detector 81 for heterodyning the received frequency-modulated signals. Unless the operating frequency is relatively high, such a coupling loop generally provides insufficient coupling to the balanced detector circuit since the loop circuit must necessarily be of low Q for ease of alignment and circuit stability. Therefore, the output coupling circuit shown in Fig. 1 is generally to be preferred even though the output coupling resistors 77, 79 dissipate some of the filter output energy.

The third embodiment of the invention illustrated in Figures 4 and 5 of the drawing is similar to the filter network illustrated in Fig. 1 with the exception that the series filter tuning capacitors 53, 57, 61 are entirely enclosed within the shielding enclosure 51, comprising cylindrical elements 67, 69 and 71 threaded into collars 111, 113 and 115, respectively. Locking screws 117 are provided for each of the collars. Adjustment of the series capacitors 53, 57, 61 is permitted through apertures 119 in the top wall of the shielding enclosure aligned with each of the threaded cylindrical elements.

Another distinguishing feature of said third embodiment of the invention is that the shunt tuning capacitors 55, 59, 63 and 65 comprise cylindrical conductive rods extending transversely within the shielding enclosure and disposed adjacent to and perpendicular to the cylindrical inductive elements 41, 45, 47, 49, respectively. By either vertical or horizontal adjustment of the positions of the capacitive rods 55, 59, 63 and 65 with respect to their associated inductive elements, the capacitance therebetween may be readily adjusted, and the coupling to the inductive elements may be selected at any desired point thereon. A third distinguishing feature of the third embodiment of the invention is that only the coupling between the second and third filter sections is adjustable by adjustment of the position of a shielding element 121 disposed between the inductive element 45 and the output inductive elements 47, 49.

It should be understood that, in any of the embodiments of the invention described heretofore, the number of filter sections to be employed will depend upon the desired selectivity and sharpness of frequency cut-off required. Three filter sections have been employed in each of the embodiments of the invention purely by way of illustration.

Thus the invention described comprises an improved ultra-high-frequency band-pass filter network employing a plurality of cylindrical inductive elements combined with individual series and shunt capacitive tuning elements and all enclosed within a common shielding enclosure. The coupling between each of the filter sections is adjustable by adjustment of the spacing or shielding therebetween for controlling the selectivity and frequency cut-off characteristics of the system. External adjustments are provided for tuning each of the filter sections. A balanced output circuit is provided for coupling the filter to a balanced load circuit such as a balanced ultra-high-frequency detector.

I claim as my invention:

1. A microwave band-pass filter network comprising a hollow shielding enclosure, a plurality of cylindrical inductive elements disposed in mutually inductively coupled spaced relation within said enclosure, separate adjustable capacitive elements interposed between said inductive elements and a wall of said enclosure for tuning said inductive elements, the relative tuning of said elements and the mutual coupling therebetween being determinative of the frequency band-pass characteristics of said network, input signal means extending into said enclosure and coupled to one of said inductive elements, and balanced output signal means extending into said enclosure and coupled to two other adjacent ones of said inductive elements.

2. A microwave band-pass filter network comprising a hollow shielding enclosure, a plurality of cylindrical inductive elements disposed in mutually adjustably inductively coupled parallel spaced relation within said enclosure, separate adjustable capacity elements serially interposed between said inductive elements and a wall of said enclosure for separately tuning each of said inductive elements, the relative tuning of said elements and the mutual coupling therebetween being determinative of the frequency band-pass characteristics of said network, two of said adjacent inductive elements being push-pull resonant at an operating pass frequency of said network, input signal means extending into said enclosure and coupled to one of said inductive elements, and balanced output signal means extending into said enclosure and coupled to said two adjacent inductive elements.

3. A microwave band-pass filter network comprising a hollow shielding enclosure, a plurality of cylindrical inductive elements disposed in mutually adjustably inductively coupled parallel spaced relation within said enclosure, separate adjustable capacitive elements serially interposed between said inductive elements and a wall of said enclosure for separately tuning each of said inductive elements, the relative tuning of said elements and the mutual coupling therebetween being determinative of the frequency band-pass characteristics of said network, two of said adjacent inductive elements being push-pull resonant at an operating pass frequency of said network, additional cylindrical fixed capacitive elements projecting from the walls of said enclosure and extending therein closely adjacent to and perpendicularly disposed with respect to said inductive elements, input signal means extending into said enclosure and coupled to one of said inductive elements, and balanced output signal means extending into said enclosure and coupled to said two adjacent inductive elements.

4. A microwave band-pass filter network comprising a hollow rectangular shielding enclosure, a plurality of cylindrical inductive elements disposed in mutually adjustably inductively coupled parallel spaced relation within said enclosure, separate adjustable capacitive elements serially interposed between said inductive elements and a wall of said enclosure for separately tuning each of said inductive elements, the relative tuning of said elements and the mutual coupling therebetween being determinative of the frequency band-pass characteristics of said network, two adjacent ones of said inductive elements being push-pull resonant to an operating pass frequency of said network, additional cylindrical fixed capacitive elements projecting from the walls of said enclosure and extending therein closely adjacent to and perpendicularly disposed with respect to said inductive elements, input signal means extending into said enclosure and connected to one of said inductive elements, and balanced output signal means extending into said enclosure and coupled to said two adjacent inductive elements.

5. A microwave band-pass filter network comprising a hollow shielding enclosure, a plurality of cylindrical inductive elements disposed in mutually adjustably inductively coupled parallel spaced relation within said enclosure, means for adjusting the relative spacing of said inductive elements, separate adjustable capacitive elements serially interposed between one end of said inductive elements and a wall of said enclosure for separately tuning each of said inductive elements, the relative tuning of said elements and the mutual coupling therebetween being determinative of the frequency band-pass characteristics of said network, one of said adjustable capacitive elements being serially coupled to two adjacent inductive elements and providing push-pull resonance thereof at an operating pass frequency, additional cylindrical fixed capacitive elements projecting from the walls of said enclosure and extending therein closely adjacent to and perpendicularly disposed with respect to said inductive elements, input signal means extending into said enclosure and coupled to one of said inductive elements, and balanced output signal means extending into said enclosure and coupled to said two adjacent inductive elements.

6. A microwave band-pass filter network comprising a hollow shielding enclosure, a plurality of cylindrical inductive elements disposed in mutually adjustably inductively coupled parallel spaced relation within said enclosure, separate adjustable capacitive elements serially interposed between said inductive elements and a wall of said enclosure for separately tuning each of said inductive elements, the relative tuning of said elements and the mutual coupling therebetween being determinative of the frequency band-pass characteristics of said network, one of said adjustable capacitive elements being serially coupled to two adjacent inductive elements and providing push-pull resonance thereof at the operating mean pass frequency, additional cylindrical fixed capacitive elements, projecting from the walls of said enclosure and extending therein closely adjacent to and perpendicularly disposed with respect to said inductive elements, first signal means extending into said enclosure and connected to an intermediate point on one of said inductive elements, and balanced second signal connections extending into said enclosure and separately connected to said two adjacent inductive elements.

7. A microwave band-pass filter network comprising a hollow shielding enclosure, a plurality of cylindrical inductive elements disposed in mutually adjustably inductively coupled parallel spaced relation within said enclosure, separate adjustable capacitive elements serially interposed between said inductive elements and a wall of said enclosure for separately tuning each of said inductive elements, the relative tuning of said elements and the mutual coupling therebetween being determinative of the frequency band-pass characteristics of said network, additional cylindrical fixed capacitive elements projecting from the walls of said enclosure and extending therein closely adjacent to and perpendicularly disposed with respect to said inductive elements, first signal means extending into said enclosure and connected to one of said inductive elements, and balanced second signal means comprising a coupling loop extending into said enclosure and coupled to one of said inductive elements.

8. A microwave band-pass filter network comprising a hollow rectangular shielding enclosure, a plurality of cylindrical inductive elements disposed in mutually adjustably inductively coupled parallel spaced relation within said enclosure parallel to one of the axes thereof, separate adjustable capacitive tuning elements serially interposed between said inductive elements and a wall of said enclosure for separately tuning each of said inductive elements, the relative tuning of said elements and the mutual coupling therebetween being determinative of the frequency band-pass characteristics of said network, one of said adjustable capacitive elements being serially coupled to two adjacent inductive elements located adjacent to one end of said enclosure and providing push-pull resonance thereof at the desired mean-pass frequency, additional cylindrical fixed capacitive tuning elements projecting from the walls of said enclosure and extending therein closely adjacent to and perpendicularly disposed with respect to said inductive elements, input signal means extending into and adjacent to one end of said enclosure and coupled to one of said inductive elements, and balanced output signal means extending into and adjacent to the opposite end of said enclosure and coupled to said two adjacent inductive elements.

9. Apparatus according to claim 8 including means for adjusting the relative spacing of said inductive elements.

10. Apparatus according to claim 1 including means for adjusting the relative spacing of said inductive elements.

11. A microwave band-pass filter network comprising a hollow rectangular shielding enclosure, a plurality of cylindrical inductive elements disposed in mutually adjustably inductively coupled parallel spaced relation within said enclosure in a plane parallel to one of the axes thereof, means for adjusting the relative spacing of said inductive elements in said plane, separate adjustable capacitive tuning elements axially interposed between one end of said inductive elements and a wall of said enclosure for separately tuning each of said inductive elements, the relative tuning of said elements and the mutual coupling therebetween being determinative of the frequency band-pass characteristics of said network, one of said adjustable capacitive elements being serially coupled to two adjacent inductive elements located adjacent to one end of said enclosure and providing push-pull resonance thereof at the desired mean-pass frequency, additional cylindrical fixed capacitive tuning elements projecting from the walls of said enclosure and extending therein closely adjacent to and perpendicularly disposed with respect to said inductive elements, input signal means extending into and adjacent to one end of said enclosure and connected to one of said inductive elements, and balanced output signal means extending into and adjacent to the opposite end of said enclosure and coupled in opposite phase to said two adjacent inductive elements.

HARRY KIHN.

REFERENCES CITED

The following references are of record in the file of this patent:

UNITED STATES PATENTS

| Number | Name | Date |
|---|---|---|
| 2,143,891 | Lindenblad | Jan. 17, 1939 |
| 2,286,396 | Trevor | June 16, 1942 |
| 2,366,750 | Pray | Jan. 9, 1945 |
| 2,402,443 | Peterson | June 18, 1946 |
| 2,404,640 | Lawrance | July 23, 1946 |
| 2,428,272 | Evans | Sept. 30, 1947 |